United States Patent
Venkataramana et al.

(10) Patent No.: US 11,269,735 B2
(45) Date of Patent: Mar. 8, 2022

(54) METHODS AND SYSTEMS FOR PERFORMING DATA BACKUPS

(71) Applicant: EMC IP Holding Company LLC, Hopkinton, MA (US)

(72) Inventors: Mahesh Reddy Appireddygari Venkataramana, Bangalore (IN); Shelesh Chopra, Bangalore (IN); Sunil Yadav, Bangalore (IN); Divyangana Sisodia, Gwalior (IN); Yagnavalkya Chennojwala, Bangalore (IN); Asif Khan, Bangalore (IN); Aneesh Kumar Gurindapalli, Vijayawada (IN)

(73) Assignee: EMC IP Holding Company LLC, Hopkinton, MA (US)

(*) Notice: Subject to any disclaimer, the term of this patent is extended or adjusted under 35 U.S.C. 154(b) by 16 days.

(21) Appl. No.: 16/805,272

(22) Filed: Feb. 28, 2020

(65) Prior Publication Data
US 2021/0271563 A1   Sep. 2, 2021

(51) Int. Cl.
*G06F 11/14* (2006.01)
*G06F 3/06* (2006.01)

(52) U.S. Cl.
CPC .......... *G06F 11/1464* (2013.01); *G06F 3/064* (2013.01); *G06F 3/067* (2013.01); *G06F 3/0619* (2013.01); *G06F 3/0631* (2013.01); *G06F 3/0659* (2013.01); *G06F 3/0683* (2013.01); *G06F 11/1451* (2013.01); *G06F 11/1461* (2013.01); *G06F 11/1469* (2013.01)

(58) Field of Classification Search
CPC ............ G06F 11/1464; G06F 11/1469; G06F 11/1461; G06F 3/064; G06F 3/0631; G06F 11/1451; G06F 3/0659; G06F 3/0683; G06F 3/0619; G06F 3/067
See application file for complete search history.

(56) References Cited

U.S. PATENT DOCUMENTS

| | | | |
|---|---|---|---|
| 7,440,965 B1* | 10/2008 | Pruthi | G06F 11/1448 |
| 10,552,266 B1* | 2/2020 | Kogtev | G06F 9/45558 |
| 2016/0292041 A1* | 10/2016 | Bender | G06F 11/1435 |
| 2017/0093886 A1* | 3/2017 | Ovcharik | H04L 9/002 |
| 2018/0018109 A1* | 1/2018 | Mueller | G06F 3/0677 |
| 2018/0260281 A1* | 9/2018 | Monk | G06F 12/0824 |
| 2020/0293193 A1* | 9/2020 | Littlefield | G06F 3/0608 |

OTHER PUBLICATIONS

[MS-VHDX]: Virtual Hard Disk v2 (VHDX) File Format; Microsoft Corporation; Sep. 12, 2018 (38 pages).

* cited by examiner

*Primary Examiner* — Masud K Khan
*Assistant Examiner* — Trung-Hao Joseph Nguyen
(74) *Attorney, Agent, or Firm* — Chamberlain, Hrdlicka, White, Williams & Aughtry

(57) ABSTRACT

A method for backing up a storage volume that includes receiving, by a volume manager, a block allocation table of a cloned storage volume backup, selecting a modification entry that comprises a volume offset for modified file data, obtaining a backup offset for the cloned storage volume backup based on the block allocation table and the volume offset, updating, based on the backup offset, the block allocation table to obtain an updated block allocation table, and sending the modified file data and the updated block allocation table to a backup server.

14 Claims, 5 Drawing Sheets

METHODS AND SYSTEMS FOR PERFORMING DATA BACKUPS

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, the invention relates to a method for backing up a storage volume that includes receiving, by a volume manager, a block allocation table of a cloned storage volume backup, selecting a modification entry that comprises a volume offset for modified file data, obtaining a backup offset for the cloned storage volume backup based on the block allocation table and the volume offset, updating, based on the backup offset, the block allocation table to obtain an updated block allocation table, and sending the modified file data and the updated block allocation table to a backup server.

In general, in one aspect, the invention relates to a non-transitory computer readable medium that includes instructions which, when executed by a computer processor, enables the computer processor to perform a method for backing up a storage volume that includes receiving, by a volume manager, a block allocation table of a cloned storage volume backup, selecting a modification entry that comprises a volume offset for modified file data, obtaining a backup offset for the cloned storage volume backup based on the block allocation table and the volume offset, updating, based on the backup offset, the block allocation table to obtain an updated block allocation table, and sending the modified file data and the updated block allocation table to a backup server.

In general, in one aspect, the invention relates to a storage server that includes memory, and a processor, wherein the processor is configured to perform a method for backing up a storage volume that includes receiving, by a volume manager, a block allocation table of a cloned storage volume backup, selecting a modification entry that comprises a volume offset for modified file data, obtaining a backup offset for the cloned storage volume backup based on the block allocation table and the volume offset, updating, based on the backup offset, the block allocation table to obtain an updated block allocation table, and sending the modified file data and the updated block allocation table to a backup server.

Other aspects of the invention will be apparent from the following description and the appended claims.

DETAILED DESCRIPTION

Figure 1:
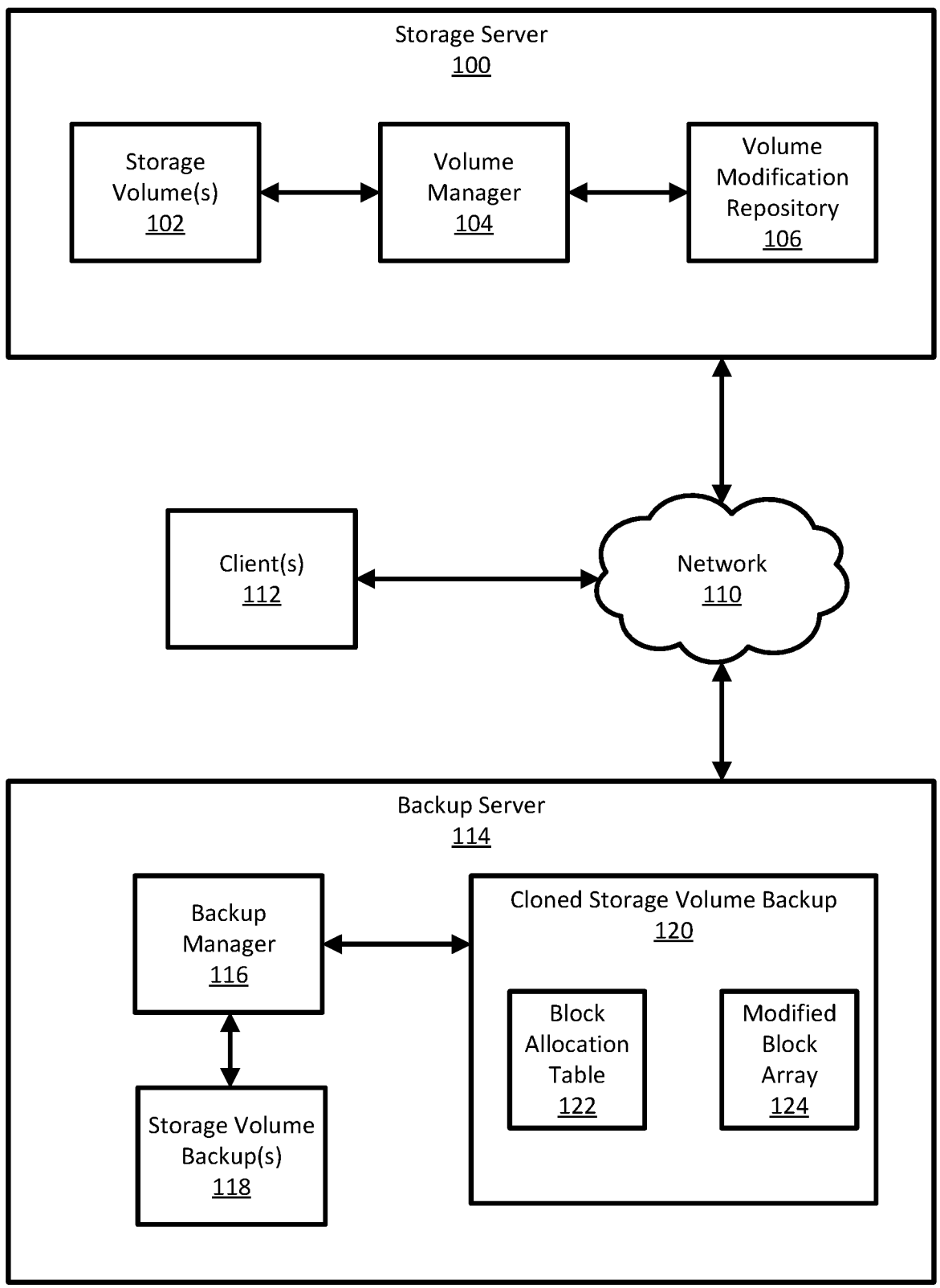
FIG. 1 shows a diagram of a system, in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems and methods for decreasing the size of the data segments written to an incremental backup of a storage volume. Traditionally, after an initial backup copy of a volume is created, any subsequent changes to the volume may be tracked at a "block" level. Then, when the creation of a new backup is initiated, only the blocks that include modified file data are copied to a new incremental backup (e.g., "block based backup"). However, although such a method does not require re-copying the entire volume to create a backup, unnecessary network and storage resources are nonetheless consumed by copying blocks that include only partially modified file data. For example, although only blocks that include modified file data are included in the incremental backup, those blocks may include mostly unmodified file data that already exists in a previously created backup. For example, if a single byte of a 32-megabyte block is modified, the entire 32-megabyte block is copied to the next incremental backup—even though less than one-millionth of the data in that block was modified.

To further reduce storage and network consumption, one or more embodiments of the invention described herein provides a method to track the location(s) of modified file data at a more granular level and copy only that modified file data to the backup server. That is, in one or more embodiments of the invention, when the creation of a new incremental backup is initiated, only the file data modified since the creation of the last incremental backup is copied to the new incremental backup. To accomplish this, one or more embodiments of the invention, provide that the volume offset of the modified file data is tracked and, when the creation of a new backup is initiated, the modified file data is copied to a clone of the most recently created incremental backup (overwriting existing file data or creating new file data) to generate the new incremental backup. Further, in order to maintain compatibility with existing block based backup recovery systems, the volume offset for each modification is then compared against the metadata of the previous incremental backup to identify the "block" corresponding to the modified file data. Once the modified blocks are known, the metadata of the new incremental backup is updated to reflect which blocks include the newly modified file data. Thus, when read by recovery software, the new incremental backup appears as if it were created via traditional processes.

Accordingly, to create the new incremental backup, only file data that was modified since the last backup is transmitted to the backup server. Further, depending on how the operating system of the backup server creates "copies" of files, the cloned incremental backup, when initially generated, may only create a reference to the existing incremental backup (to avoid storing duplicative data). Further, when the modified file data is written to the cloned incremental backup, the operating system may store only those changes thereby further saving storage space on the backup server.

FIG. 1 shows a diagram of a system, in accordance with one or more embodiments of the invention. The system may include a network (110), operatively connected to a storage server (100), one or more client(s) (112), and a backup server (114). Each of these components is described below.

In one or more embodiments of the invention, a network (e.g., network (110)) is a collection of connected network devices (not shown) that allow for the communication of data from one network device (not shown) to other network devices (not shown), or the sharing of resources among network devices (not shown). Examples of a network (e.g., network (110)) include, but are not limited to, a local area network (LAN), a wide area network (WAN) (e.g., the Internet), a mobile network, or any other type of network that allows for the communication of data and sharing of resources among network devices and/or devices operatively connected to the network (110). One of ordinary skill in the art, having the benefit of this detailed description, would appreciate that a network (e.g., network (110)) is a collection of operatively connected devices that enables communication between those devices.

In one or more embodiments of the invention, a client (e.g., client(s) (112)) is implemented as a computing device. Each computing device may include one or more processors, memory (e.g., random access memory), and persistent storage (e.g., disk drives, solid state drives, etc.). The persistent storage may store computer instructions (e.g., computer code) which, when executed by the processor(s) of the computing device, cause the computing device to issue one or more requests and to receive one or more responses. Examples of a computing device include a mobile phone, tablet computer, laptop computer, desktop computer, server, distributed computing system, or cloud resource. In one or more embodiments of the invention, a client (e.g., client(s) (112)) may be implemented as a logical device. The logical device may utilize the computing resources of any number of computing devices (defined above).

In one or more embodiments of the invention, a computing device includes a communication interface (not shown). In one or more embodiments of the invention, a communication interface is a hardware component that provides capabilities to interface a computing device with one or more devices (e.g., through a network to another client, another server, a network of devices, etc.) and allow for the transmission and receipt of data with those devices. A communication interface may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access (RDMA), Institute of Electrical and Electronics Engineers (IEEE) 801.11, etc.).

In one or more embodiments of the invention, a storage server (e.g., storage server (100)) is hardware configured to manage, provide resources to, and/or execute one or more storage volume(s) (e.g., storage volume(s) (102)), execute corresponding software (e.g., 104), and/or store corresponding data structure(s) (e.g., 106, 108). In one or more embodiments of the invention, a storage server (e.g., storage server (100)) is implemented as a computing device and includes one or more storage volume(s) (102), a volume manager (104), volume modification repository (106). Each of these components is described below.

In one or more embodiments of the invention, a storage volume (e.g., storage volume(s) (102)) is a logical storage structure that stores one or more file(s) for use by a file system (not shown). In one embodiment of the invention, an entire physical storage device (not shown), two or more physical storage devices, a portion of one physical storage device, two or more portions of two or more physical storage devices, and/or any combination thereof may be allocated to a storage volume (e.g., storage volume(s) (102)). Accordingly, in one or more embodiments of the invention, a storage volume (e.g., storage volume(s) (102)) provides a layer of logical indirection between software utilizing a file system and the underlying physical storage devices.

In one or more embodiments of the invention, a volume manager (e.g., volume manager (104)) is software executing on the storage server (100). In one or more embodiments of the invention, a volume manager (e.g., volume manager (104)) may be software that directly executes within the user space of a computing device and allows for the creation, maintenance, modification, and/or configuration of one or more storage volume(s) (e.g., storage volume(s) (102)). In one embodiment of the invention, a volume manager (e.g., volume manager (104)) is configured to identify and track information (e.g., metadata) about one or more storage volume(s) (e.g., storage volume(s) (102)) and store that information in one or more data structures (e.g., volume modification repository (106)). In one or more embodiments of the invention, a volume manager (e.g., volume manager (104)) identifies data modification made to a storage volume (e.g., storage volume(s) (102)) and creates a modification entry (not shown) in volume modification repository (e.g., volume modification repository (106)) associated with the storage volume storage volume (e.g., storage volume(s) (102)). A volume manager (e.g., volume manager (104)) may perform some or all of the method(s) shown in FIGS. 2-4.

In one or more embodiments of the invention, volume modification repository (e.g., volume modification repository (106)) is a data structure that includes one or more modification entries (not shown) that specify modifications made to an associated storage volume (e.g., storage volume(s) (102)). In one or more embodiments of the invention, a modification entry (not shown) includes a volume offset that specifies a location, in the associated storage volume (e.g., storage volume(s) (102)), where the modification of the file (or portion thereof) occurred. In one or more embodiments of the invention, each modification entry may further include a file identifier for the modified file (i.e., a unique alphanumeric expression associated with the file), a length of the modified file data (e.g., number of bits/bytes), and/or any other data related to the associated file modification.

In one or more embodiments of the invention, a volume modification repository (e.g., volume modification repository (106)) may be uniquely associated with a single storage volume (e.g., storage volume(s) (102)). Additionally, in one or more embodiments of the invention, a volume modification repository (e.g., volume modification repository (106)) may be associated with two or more storage volumes, where each modification entry of the volume modification repository (e.g., volume modification repository (106)) further includes a volume identifier (i.e., a unique alphanumeric expression associated with the volume) that is uniquely associated with the storage volume (e.g., storage volume(s) (102)) that includes the modified file. In one or more embodiments of the invention, a plurality of volume modification repositories (e.g., volume modification repository (106)) may exist (not shown).

In one or more embodiments of the invention, a backup server (e.g., backup server (114)) is hardware configured to manage, provide resources to, and/or execute one or more storage volume backups(s) (e.g., storage volume backup(s) (118), cloned storage volume backup (120)) and/or execute corresponding software (e.g., backup manager (116)). In one or more embodiments of the invention, a backup server (e.g., backup server (114)) is implemented as a computing device and includes one or more storage volume backup(s) (118), backup manager (116), and a cloned storage volume backup (120). Each of these components is described below.

In one or more embodiments of the invention, a backup manager (e.g., backup manager(s) (116)) is software executing on the backup server (114). In one embodiment of the invention, a backup manager (e.g., backup manager(s) (116)) is configured to create, maintain, modify, and/or configure storage volume backup(s) (e.g., storage volume backup(s) (118)). In one or more embodiments of the invention, a backup manager (e.g., backup manager(s) (116)) may receive requests, and in response to receiving those requests, serve data and/or modify data based on the request. A backup manager (e.g., backup manager(s) (116)) may perform some or all of the method shown in FIG. 5.

In one or more embodiments of the invention, a storage volume backup (e.g., storage volume backup(s) (118), cloned storage volume backup (120)) includes all or a portion of the data of an associated storage volume (e.g., storage volume(s) (102)). In one or more embodiments of the invention, a storage volume backup (e.g., 118, 120) may be a file that, when read, emulates (e.g., virtualizes) the storage volume (e.g., storage volume(s) (102)) associated with that storage volume backup (e.g., 118, 120). As a non-limiting example, a storage volume backup (e.g., 118, 120) may be a virtual hard disk file (e.g., VHD or VHDX file format, collectively "VHD\X") that may allow an operating system to "mount" the file and emulate the existence of a storage volume (e.g., storage volume(s) (102)) from which the virtual hard disk file was made. In one or more embodiments of the invention, a storage volume backup (e.g., 118, 120) segments data of the associated storage volume (e.g., storage volume(s) (102)) in "blocks" where, a "block" is a fixed-length data segment that is larger than the smallest units of data normally accessible (e.g., "bytes"). In one or more embodiments of the invention, a storage volume backup (e.g., 118, 120) includes a block allocation table (e.g., block allocation table (122)), a modified block array (e.g., modified block array (124)), and/or a timestamp (an alphanumeric or numeric-only expression that specifies a time) indicating a time when the storage volume backup was created.

In one or more embodiments of the invention, a storage volume backup (e.g., 118, 120) may be an incremental backup that includes only file modifications (e.g., blocks that have been modified) that accrued between the creation of the most recent storage volume backup (e.g., 118, 120) and when the backup was initiated for the associated storage volume (e.g., storage volume(s) (102)). For example, in one embodiment of the invention, two or more storage volume backups (e.g., 118, 120) may be a series of cumulative backup files that include the modified "blocks" of an associated storage volume (e.g., storage volume(s) (102)) that have accrued since the creation of the last storage volume backup (e.g., 118, 120).

In one or more embodiments of the invention, a cloned storage volume backup (e.g., cloned storage volume backup (120)) is a copy of the most recently created storage volume backup (e.g., storage volume backup(s) (118)) for a particular volume. In one or more embodiments of the invention, a cloned storage volume backup (e.g., cloned storage volume backup (120)) may be created by the backup manager (e.g., backup manager (116)) in response to a request to generate a new storage volume backup (e.g., 118, 120). In one or more embodiments of the invention, a cloned storage volume backup (e.g., cloned storage volume backup (120)) may be created to serve as the basis for the creation of a new storage volume backup (e.g., storage volume backup(s) (118))

In one or more embodiments of the invention, a block allocation table (e.g., block allocation table (122)) is a data structure that includes one or more block entry(ies) (not shown) for a storage volume backup (e.g., storage volume backup(s) (118)) and which of those blocks are occupied with data. In one or more embodiments of the invention, a block entry includes one or more block offset(s) that indicate the location of each block within the storage volume backup (e.g., 118, 120). Further, in one or more embodiments of the invention, a block allocation table (e.g., block allocation table (122)) includes one or more file offset(s) that specify (i) a file (e.g., via file identifier), (ii) the location of the starting position (e.g., byte location) of a file within the storage volume backup (e.g., 118, 120), (iii) the length of the file data, and/or (iv) which block(s) of the storage volume backup (e.g., 118, 120) includes the file data. In one embodiment of the invention, a block allocation table (e.g., block allocation table (122)) includes a translation table (not shown) that provides mappings between block offsets and file offsets.

In one or more embodiments of the invention, a modified block array (e.g., modified block array (124)) is a data structure that maintains a binary indication (for each block of the storage volume backup (e.g., 118, 120)) that includes modified file data. In one or more embodiments of the invention, a modified block array (e.g., modified block array (124)) is a series of bits that are uniquely assigned to a respective number of blocks of the storage volume backup (e.g., 118, 120) (i.e., the modified block array includes, at least, one bit for each block of the storage volume backup) and are either modified to indicate a "0" or "1" based on whether the associated block of the storage volume backup (e.g., 118, 120) includes data that has been modified since the creation of the most recently created storage volume backup (e.g., 118, 120). In one embodiment of the invention, a modified block array may be implemented as a bitmap (e.g., a VHD\X bitmap).

In one or more embodiments of the invention, the block allocation table (e.g., block allocation table (122)) and the modified block array (e.g., modified block array (124)) may be data segments of a "VHD\X container" that may additionally include a header, log, and/or other metadata for the VHD\X storage volume backup file.

While FIG. 1 shows a specific configuration of a system, other configurations may be used without departing from the scope of the invention. For example, although the storage volume(s) (102), volume manager (104), and volume modification repository (106) of the storage server (100) are shown to be exist within the single storage server (100), each component (102, 104, 106) may execute and/or exist independently and/or in some combination on different hardware devices operatively connected via a network (e.g., network (110)). Similarly, although the backup manager (116), storage volume backups(s) (118), and cloned storage volume backup (120) is shown to exist within the single backup server (114), each component (116, 118, 120) may execute and/or exist independently and/or in some combination on different hardware devices operatively connected via a network (e.g., network (110)). Alternatively, in one or more embodiments of the invention, each component (102, 104, 106, 116, 118, 120) may execute and exist on the same hardware device. Accordingly, embodiments disclosed herein should not be limited to the configuration of devices and/or components shown in FIG. 1.

Figure 2:
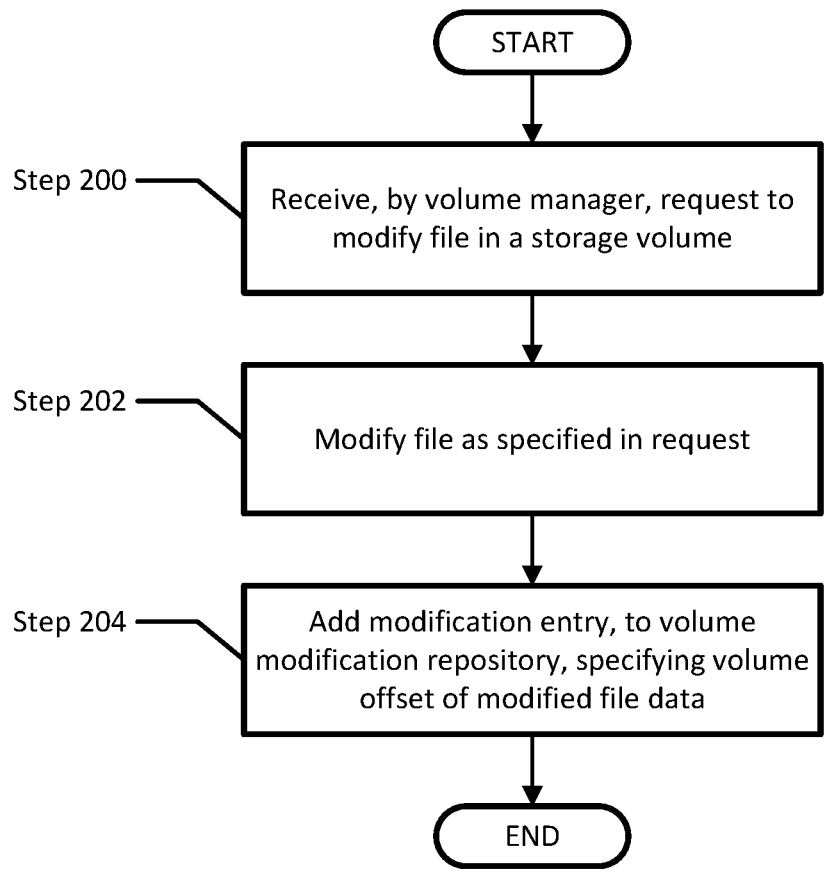
FIG. 2 shows a flowchart of a method of maintaining a volume modification repository, in accordance with one or more embodiments of the invention.

FIG. 2 shows a flowchart of a method of maintaining a volume modification repository, in accordance with one or more embodiments of the invention. All or a portion of the method shown in FIG. 2 may be performed by one or more components of the volume manager. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 200, a volume manager receives a request to modify a file in a storage volume of the storage server. The request to modify a file of the storage volume may be a request to overwrite a portion of an existing file and/or a request to write new data (increasing the size of an existing file or creating a new file). In one or more embodiments of the invention, a request to modify a file in a storage volume may include (i) a file identifier, (ii) a location of the file (of portion thereof) modified in the storage volume (e.g., via file offset and/or volume offset), and/or (iii) the modification to be made.

In Step 202, the volume manager modifies the file as specified in the request received in Step 200. In one or more embodiments of the invention, the volume manager may not be involved in the process of modifying files of the volume; rather, the volume manager may instead be configured to identify when a modification to a file of the storage volume is made (e.g., by receiving system events that indicate relevant operations). In either case, in one or more embodiments of the invention, the volume manager is configured to receive data indicating the modification of a file in a volume and the volume offset of the modified file data.

In Step 204, the volume manager creates a new modification entry in a volume modification repository. In one or more embodiments of the invention, as discussed in the description of FIG. 1, a modification entry may include a volume offset that specifies a location, in the associated storage volume, where the modification of the file (or modified portion of the file) occurred, a file identifier, a length of the modified file data, and/or any other data related to the associated file modification.

Figure 3:
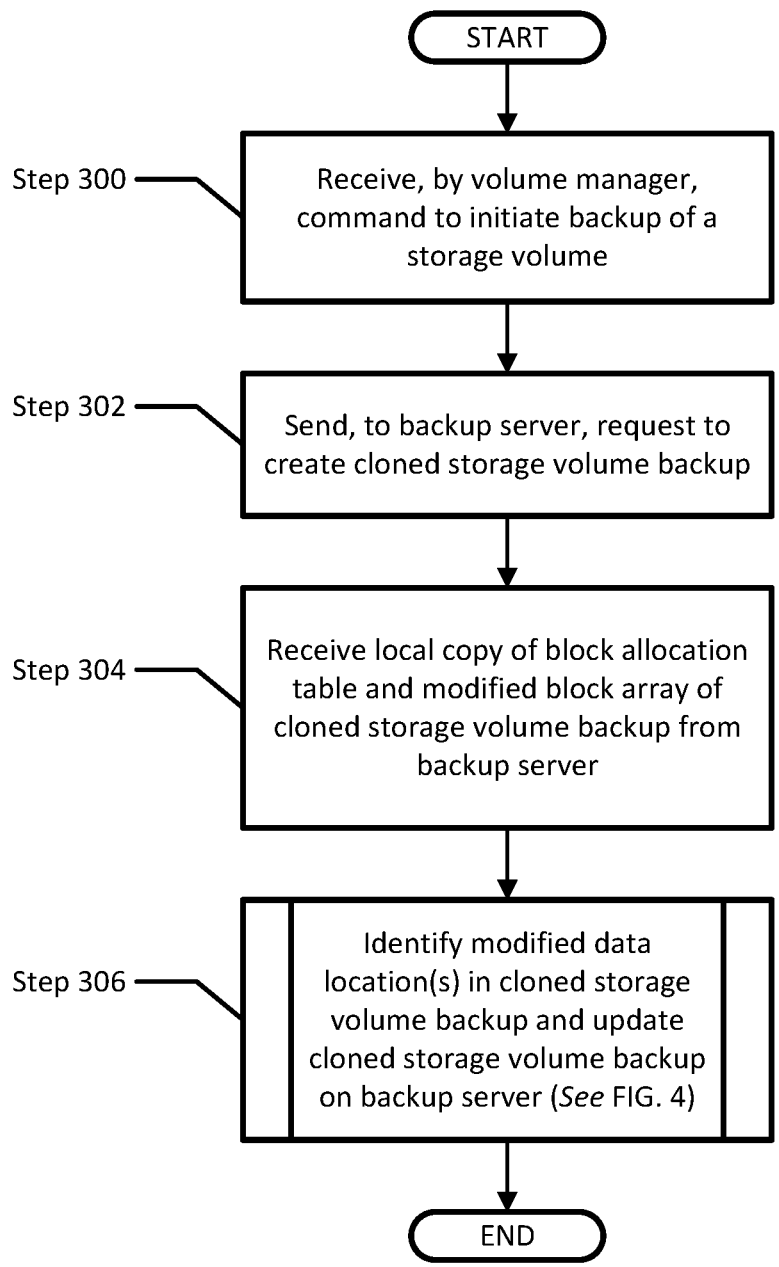
FIG. 3 shows a flowchart of a method of performing a backup operation, in accordance with one or more embodiments of the invention.

FIG. 3 shows a flowchart of a method of performing a backup operation, in accordance with one or more embodiments of the invention. All or a portion of the method shown in FIG. 3 may be performed by one or more components of the volume manager. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 300, a volume manager receives a command to initiate a backup of a storage volume. In one or more embodiments of the invention, a request to initiate a backup of a storage volume may include a volume identifier.

In Step 302, the volume manager sends a request to the backup server to initiate creation of a cloned storage volume backup. In one or more embodiments of the invention, the request to create a cloned storage volume backup may include a volume identifier and command to generate a copy of the most-recently-created storage volume backup for the storage volume specified by the volume identifier. Further, in one or more embodiments of the invention, the volume manager may further request that the backup server send a copy of the block allocation table and modified block array, of the cloned storage volume backup, to the volume manager. In one or more embodiments of the invention, the command to generate the cloned storage volume backup uses ordinary "copy" commands that are common to existing operating systems and not specific to backup software (e.g., "block based backup"-type software). Accordingly, the volume manager does not have to be configured to generate any specialized commands and/or requests in order to send the request to generate the cloned storage volume backup.

In one or more embodiments of the invention, the request to create a cloned storage volume backup is sent from a communication interface of the storage server (on which the volume manager is executing) through a network to a communication interface of the backup server (on which the backup manager is executing).

In Step 304, the volume manager receives a copy of the block allocation table and modified block array of the cloned storage volume backup. In one or more embodiments of the invention, the backup server (and/or the backup manager thereof) may be configured to automatically send the block allocation table and modified block array upon creation of the cloned storage volume backup. Alternatively, in one or more embodiments of the invention, the volume manager may request a copy of the block allocation table and modified block array separately from the request to generate the cloned storage volume backup which, in turn, causes the backup server (and/or backup manager thereof) to send the block allocation table and modified block array to the volume manager.

In Step 306, the volume manager identifies the locations in the cloned storage volume backup where the modified file data is to be written, sends the modified file data to the backup server, and updates the block allocation table and modified block array for the cloned storage volume backup. Details regarding the process of Step 306 are discussed in the description of FIG. 4.

Figure 4:
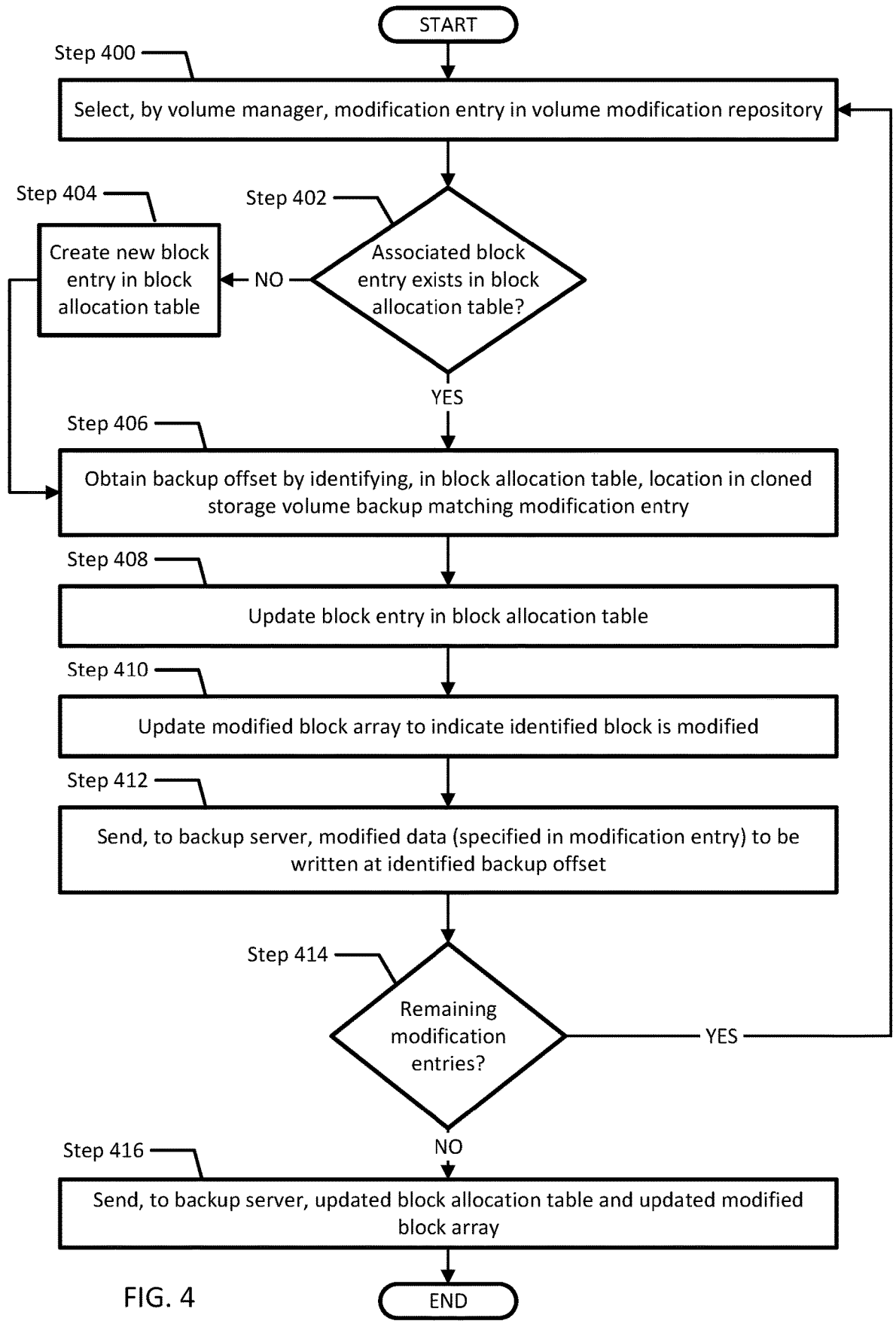
FIG. 4 shows a flowchart of a method of performing a backup operation, in accordance with one or more embodiments of the invention.

FIG. 4 shows a flowchart of a method of performing a backup operation, in accordance with one or more embodiments of the invention. All or a portion of the method shown in FIG. 4 may be performed by one or more components of the volume manager. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, the volume manager selects a modification entry in the volume modification repository. In one or more embodiments of the invention, the volume manager may select a modification entry based on the order the modification entry was added to the volume modification repository (e.g., first-in-first-out (FIFO), last-in-first-out (LIFO), the volume offset, or any other possible method for selecting a modification entry of the volume modification repository.

In Step 402, the volume manager determines if a block entry exists in the block allocation table associated with the location of the modified file data (specified by the volume offset of the modification entry). In one or more embodiments of the invention, the volume offset of the modification entry corresponds to a block in the cloned storage volume backup that would store the modified file data, if copied. Accordingly, in one or more embodiments of the invention, the block allocation table may include a block entry associated with a block of the cloned storage volume backup that would include the modified data.

However, in one or more embodiments of the invention, if the modification was created due to the creation of new file data (e.g., not overwriting existing file data and not consuming empty space within an existing block), the volume manager will not be able to identify a block in the block allocation table to that would include the modified file data.

If it is determined that a block in the block allocation tables matches the volume offset (402—YES), the process proceeds to Step 406. Alternatively, if it is determined that the block allocation table does not include a block matching the volume offset (402—NO), the process proceeds to Step 404.

In Step 404, the volume manager creates a new block in the local copy of the block allocation table (received in Step 304). In one or more embodiments of the invention, if the modification entry includes a volume offset that specifies a location of new file data outside of the previously existing blocks of the storage volume backup, the volume manager creates a new block entry in the block allocation table that indicates the new block (of the cloned storage volume backup) that will store the new file data.

In Step 406, the volume manager obtains a backup offset in the cloned storage volume backup using the locally-stored copy of the block allocation table (received in Step 304). In one or more embodiments of the invention, a backup offset is the location (e.g., the byte address) in the cloned storage volume backup that will store the modified file data.

In one or more embodiments of the invention, the backup offset is determined by identifying the file offset in the block allocation table (of the cloned storage volume backup) that indicates the starting location of the file that includes the modified file data. Further, in one or more embodiments of the invention, the length of the file and/or length of the modified file data are used determine the location (i.e., backup offset) where the modified file data would be written to the cloned storage volume backup. In one or more embodiments of the invention, the file offset may be identified by identifying the block that would store the modified file data (as discussed in the description of Step 402) then using a translation table of the block allocation table to identify the location of the file offset within the identified block (and therefore the offset within the cloned storage volume backup generally).

In Step 408, the volume manager updates the block entry in the local copy of the block allocation table to reflect the changes indicated by the modification entry. In one or more embodiments of the invention, updating the block entry may include (i) modifying the start location of file, (ii) modifying the end location of a file, (iii) modifying the length of a file, (iv) removing a reference to a file, (v) modifying the block entry to indicate the block includes file data, (vi) modifying the block entry to indicate the block does not include file data, and/or (vii) any other appropriate modification to reflect the changes indicated by the modification entry. In one or more embodiments of the invention, the block entry to update may be identified by (i) the block allocation table, and/or (ii) the backup offset.

In Step 410, the volume manager updates the local copy of the modified block array to indicate that the identified block (identified in Step 406) includes modified file data. In one or more embodiments of the invention, if the entry of the modified block array that is associated with the identified block does not indicate that the block includes modified file data (e.g., the associated bit may be "0"), the volume manager modifies the entry to indicate that the identified block now includes modified file data (e.g., overwriting the associated bit with a "1").

In one or more embodiments of the invention, the modified block array may already include one or more entries indicating that blocks of the cloned storage volume backup (and the storage volume backup it was copied from) store modified file data. For example, in one or more embodiments of the invention, where the cloned storage volume backup is an incremental backup, only incremental modification to blocks (and/or file data thereof) are stored in the storage volume backup. Accordingly, in one or more embodiments of the invention, if the modified block array includes an entry that specifies that the identified block already includes modified file data (e.g., the associated bit may be "1"), the volume manager leaves the entry unmodified (or overwrites the entry with the same data (e.g., "1")).

In Step 412, the volume manager sends a request with the modified file data, specified by the modification entry, to the backup server and a command to write the modified file data at the backup offset (obtained in Step 406) in the cloned storage volume backup. In one or more embodiments of the invention, the volume manager reads the volume offset of the modification entry (specifying the location of the modified file data in the storage volume) and initiates the copying of the modified file data to the backup server. In one or more embodiments of the invention, the volume manager may further specify a length of the modified file data to be copied to the backup server.

In Step 414, the volume manager determines if there are any remaining modification entries in the volume modification repository. In one or more embodiments of the invention, the volume modification repository may have two or more modification entries therefore causing the volume manager to perform one or more of the preceding steps (e.g., Steps 400-412) on each modification entry. Accordingly, if it is determined that the volume modification repository includes additional modification entries that have not had their associated file data copied to the cloned storage volume backup (414—YES), the process returns back to Step 400. Alternatively, if it is determined that the volume modification repository does not include additional modification entries (e.g., the modified file data specified by each modification entry has been sent to the backup server) (414—NO), the process proceeds to Step 416.

In Step 416, the volume manager sends the updated block allocation table and updated modified block array to the backup server. In one or more embodiments of the invention, the block allocation table and modified block array of the cloned storage volume backup still include information about the cloned storage volume backup before any modifications were made to the data therein. Accordingly, in one embodiment of the invention, the block offsets and file offsets (of the block allocation table of the cloned storage volume backup on the backup server) are no longer accurate to the cloned storage volume backup as modified. Further, in one embodiment of the invention, the modified block array (of the cloned storage volume backup on the backup server) no longer accurately represents which blocks of the cloned storage volume backup are modified. Thus, in one or more embodiments of the invention, the volume manager sends the updated block allocation table and updated modified block array to the backup server to overwrite the existing version created when the cloned storage volume backup was initially created.

Figure 5:
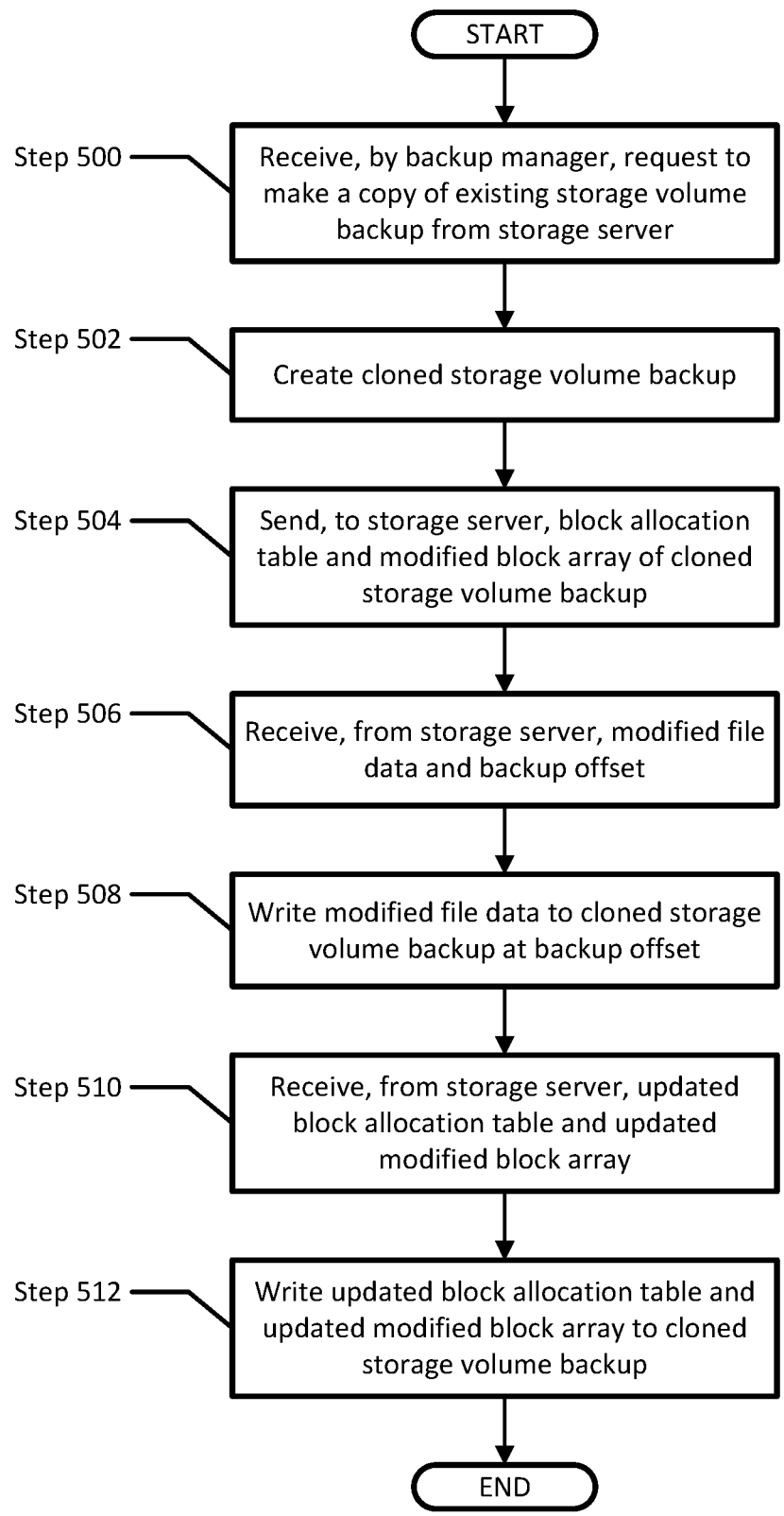
FIG. 5 shows a flowchart of a method of updating a storage volume backup, in accordance with one or more embodiments of the invention.

FIG. 5 shows a flowchart of a method of updating a storage volume backup, in accordance with one or more embodiments of the invention. All or a portion of the method shown in FIG. 5 may be performed by one or more components of the backup manager. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a backup manager of the backup server, receives a request to create copy a storage volume backup for a storage volume. In one or more embodiments of the invention, as discussed in the description of Step 302, the request to create a cloned storage volume backup may include a volume identifier and command to generate a copy of the most-recently-created storage volume backup (as may be determined by a timestamp) for a storage volume specified by the volume identifier. In one or more embodiments of the invention, the command to generate the cloned storage volume backup uses ordinary "copy" commands that are common to existing operating systems and not specific to backup software (e.g., "block based backup"-type software). Accordingly, the backup manager does not have to be configured to identify or parse any specialized commands and/or requests in order to receive the request to generate the cloned storage volume backup.

In one or more embodiments of the invention, the request to create a cloned storage volume backup is received via a communication interface of the storage server (on which the volume manager is executing) through a network to a communication interface of the backup server (on which the backup manager is executing).

In Step 502, the backup manager creates a copy of the storage volume backup of the volume (i.e., a "cloned storage volume backup") specified by the volume identifier received in Step 500. In one or more embodiments of the invention, the backup manager creates the cloned storage volume backup by identifying the most recent storage volume backup for the specified volume by the timestamp associated with the storage volume backup and performing a copy operation on the identified storage volume backup.

In one or more embodiments of the invention, the operating system of the backup server (on which the backup manager is executing) creates a "copy" of a file by initially only generating a reference to the existing version of the file, without duplicating any of the data—thereby avoiding the addition of entirely duplicative data on the underlying storage device. Further, in one or more embodiments of the invention, when the "copy" of the file is modified, the operating system (and the backup manager executing thereon) only stores the differences in file data (reflecting the file modifications) to storage. Accordingly, in one or more embodiments of the invention, the cloned storage volume backup consumes minimal storage space of the underlying storage devices, when initially created.

In Step 504, the backup manager sends the block allocation table and modified block array of the cloned storage volume backup to the storage server (and/or the volume manager thereof). In one or more embodiments of the invention, as discussed in the description of Step 304, the backup manager may be configured to automatically send the block allocation table and modified block array upon creation of the cloned storage volume backup. Alternatively, in one or more embodiments of the invention, the volume manager may request a copy of the block allocation table and modified block array, separately from the request to generate the cloned storage volume backup which, in turn, causes the backup manager to send the block allocation table and modified block array to the storage server.

In Step 506, the backup manager receives modified file data and a backup offset from the storage server. In one or more embodiments of the invention, the backup offset specifies a location in the cloned storage volume backup of where to write the modified file data.

In Step 508, the backup manager writes the modified file data to the cloned storage volume backup at the location specified by the backup offset. In one or more embodiments of the invention, as the received request includes the modified file data and the location within the cloned storage volume backup to write the modified file data (e.g., via the backup offset), the backup manager does not need to perform any additional analysis of the received modified file data to initiate writing that modified file data to the cloned storage volume backup. In one or more embodiments of the invention, the modified file data may (i) overwrite existing data within the cloned storage volume backup, (ii) be written to one or more new block(s) of the cloned storage volume backup (increasing its size), and/or (iii) some combination thereof (e.g., overwriting part of a file and adding new file data into the free space of an already-existing block).

In one or more embodiments of the invention, the backup manager may receive two or more modified file data transmission from the storage server. Accordingly, in one or more embodiments of the invention, Steps 506 and 508 may be repeated for all modified file data received by the backup manager.

In Step 510, the backup manager receives the updated block allocation table and updated modified block array from the storage server. In one or more embodiments of the invention, the updated block allocation table and updated modified block array includes references to modified file data written to the cloned storage volume backup (e.g., in Steps 506 and 508).

In Step 512, the backup manager overwrites the existing block allocation table and modified block array of the cloned storage volume backup with the updated block allocation table and updated modified block array.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for backing up a storage volume, comprising:
   receiving, by a volume manager, a block allocation table of a cloned storage volume backup, wherein prior to receiving the block allocation table, the method comprises:
      receiving a command to initiate backup of the storage volume; and
      sending, in response to the command, a request to create the cloned storage volume backup to a backup server;
   selecting a modification entry that comprises a volume offset for modified file data;
   obtaining a backup offset for the cloned storage volume backup based on the block allocation table and the volume offset, wherein obtaining the backup offset comprises:
      identifying, in the block allocation table, a file offset associated with the modified file data; and
      identifying the backup offset based on the file offset and the modified file data;
   updating, based on the backup offset, the block allocation table to obtain an updated block allocation table; and
   sending the modified file data and the updated block allocation table to a backup server.

2. The method of claim 1, wherein updating the block allocation table comprises:
   updating a block entry, of the block allocation table, to reflect the modified file data, wherein the block entry is associated with the volume offset.

3. The method of claim 2, wherein prior to obtaining the backup offset, the method further comprises:
   making a determination that the block allocation table comprises the block entry, wherein the block entry is associated with a block of the cloned storage volume backup that comprises unmodified file data, wherein the backup offset is obtained in response to the determination.

4. The method of claim 2, wherein prior to obtaining the backup offset, the method further comprises:
   making a determination that the block allocation table does not comprise the block entry; and
   creating, based on the determination, the block entry in the block allocation table associated with the volume offset.

5. The method of claim 1, wherein sending the modified file data and the updated block allocation table further comprises:
   instructing the backup server to write the modified file data at the backup offset.

6. A non-transitory computer readable medium comprising instructions which, when executed by a computer processor, enables the computer processor to perform a method for backing up a storage volume, comprising:
   receiving, by a volume manager, a block allocation table of a cloned storage volume backup, wherein prior to receiving the block allocation table, the method comprises:
      receiving a command to initiate backup of the storage volume; and
      sending, in response to the command, a request to create the cloned storage volume backup to a backup server;
   selecting a modification entry that comprises a volume offset for modified file data;
   obtaining a backup offset for the cloned storage volume backup, based on the block allocation table and the volume offset, wherein obtaining the backup offset comprises:
      identifying, in the block allocation table, a file offset associated with the modified file data; and
      identifying the backup offset based on the file offset and the modified file data;
   updating the block allocation table, based on the backup offset, to obtain an updated block allocation table; and
   sending the modified file data and the updated block allocation table to a backup server.

7. The non-transitory computer readable medium of claim 6, wherein updating the block allocation table comprises:
   updating a block entry, of the block allocation table, to reflect the modified file data, wherein the block entry is associated with the volume offset.

8. The non-transitory computer readable medium of claim 7, wherein prior to obtaining the backup offset, the method further comprises:
   making a determination that the block allocation table comprises the block entry, wherein the block entry is associated with a block of the cloned storage volume backup that comprises unmodified file data.

9. The non-transitory computer readable medium of claim 7, wherein prior to obtaining the backup offset, the method further comprises:
   making a determination that the block allocation table does not comprise the block entry; and
   creating, based on the determination, the block entry in the block allocation table associated with the volume offset.

10. The non-transitory computer readable medium of claim 6, wherein sending the modified file data and the updated block allocation table further comprises:
   instructing the backup server to write the modified file data at the backup offset.

11. A storage server, comprising:
memory; and
a processor, wherein the processor is configured to perform a method backing up a storage volume, comprising:
   receiving, by a volume manager, a block allocation table of a cloned storage volume backup, wherein prior to receiving the block allocation table, the method further comprises:
      receiving a command to initiate backup of the storage volume; and
      sending, in response to the command, a request to create the cloned storage volume backup to a backup server;
   selecting a modification entry that comprises a volume offset for modified file data;
   obtaining a backup offset for the cloned storage volume backup, based on the block allocation table and the volume offset, wherein obtaining the backup offset comprises:
      identifying, in the block allocation table, a file offset associated with the modified file data; and
      identifying the backup offset based on the file offset and the modified file data;
   updating the block allocation table, based on the backup offset, to obtain an updated block allocation table; and
   sending the modified file data and the updated block allocation table to a backup server.

12. The storage server of claim 11, wherein updating the block allocation table comprises:
   updating a block entry, of the block allocation table, to reflect the modified file data, wherein the block entry is associated with the volume offset.

13. The storage server of claim 12, wherein prior to obtaining the backup offset, the method further comprises:
   making a determination that the block allocation table comprises the block entry, wherein the block entry is associated with a block of the cloned storage volume backup that comprises unmodified file data.

14. The storage server of claim 12, wherein prior to obtaining the backup offset, the method further comprises:
   making a determination that the block allocation table does not comprise the block entry; and
   creating, based on the determination, the block entry in the block allocation table associated with the volume offset.

* * * * *